United States Patent [19]

Cobb, Jr.

[11] 4,409,879

[45] Oct. 18, 1983

[54] EXPLOSIVE ACTUATED VALVES

[75] Inventor: Lawrence L. Cobb, Jr., Livermore, Calif.

[73] Assignee: The United States of America as represented by the U.S. Department of Energy, Washington, D.C.

[21] Appl. No.: 162,611

[22] Filed: Dec. 27, 1961

[51] Int. Cl.³ .................................................. F42B 1/00
[52] U.S. Cl. ........................................... 89/1 B; 137/72
[58] Field of Search ....................... 89/1.01; 220/89 B; 251/67, 89, 90, 91; 137/70, 72, 68

[56] References Cited

U.S. PATENT DOCUMENTS 1,320,696  11/1919  Knight ............................. 137/72 X
1,988,907  1/1935   Lovekin ............................. 137/72
2,557,448  6/1951   mathison .......................... 89/1 B X

FOREIGN PATENT DOCUMENTS 504257  4/1939  United Kingdom .................. 137/72

Primary Examiner—David H. Brown
Attorney, Agent, or Firm—Dudley W. King; Richard G. Besha

EXEMPLARY CLAIM

1. A device of the character described comprising the combination of a generally tubular housing having an end portion forming a chamber to receive the sensitive portion of an explosive squib, a plunger within said housing having an end portion exposed to said chamber, squib retaining means for engaging said housing and a said squib to releasably maintain the squib in close proximity to said plunger end portion including a retaining ring of fusible material spaced outwardly from and encircling at least part of a said squib and part of its sensitive portion for reception of heat from an external source prior to appreciable reception thereof by the sensitive portion of the squib, an annular compression spring bearing at one end against said housing for urging at least a portion of the squib retaining means and a said squib away from said housing and from said plunger end portion upon subjection of the fusible material to heat sufficient to melt at least a portion thereof, and guide means for said spring to maintain even expansion thereof as a said squib is being urged away from said housing.

4 Claims, 3 Drawing Figures

EXPLOSIVE ACTUATED VALVES

The present invention relates generally to explosive actuated valves and more particularly to such which includes means for rendering them ineffective in the event of subjection to excessive temperatures.

In the operation of explosive actuated valves a squib or explosive charge is remotely actuated to move a plunger so as to establish or interrupt a fluid flow. For example, a plunger or shearing member may be moved against a frangible closure of a pressurized fluid container so as to establish communication between the fluid in the container and a point of use. Such valves have found usage in aircraft and missile control systems where it is often desirable to establish the flow of a fluid, such as a propellant or a servosystem operating medium, to an appropriate portion of the control system only after a certain cycle of operation or during a prearranged operating sequence.

Oftentimes the fluid within the container is corrosive and/or combustible so that premature release of such fluid may be disadvantageous to the operation of the system and could possibly cause or be a contributing factor to a destructive fire or explosion. A localized fire or excessive heating in the area near the explosive valve may generate sufficient heat to spontaneously fire the squib and effect operation of the valve, thus causing the premature release of the contained fluid (normally such temperature increases are not high enough to rupture the fluid container itself). It is, therefore, a principal object of the present invention to provide such explosive actuated valves with safety means for rendering the valve ineffective due to the actuation of the squib when subjected to excessive temperatures. An explosive actuated valve of the type disclosed in U.S. Pat. No. 2,959,326 may be readily modified to incorporate the safety features of the present invention.

Another object of the present invention is to provide means for releasing the mechanism securing the squib to the valve body at a temperature below that necessary to fire the squib.

A further object of the present invention is to provide means for moving the squib a sufficient distance from the valve plunger after the release of the securing mechanism so as to insure that any shock wave generated by the subsequent firing or detonation of the squib will not be sufficient to move the plunger and actuate the valve.

A still further and important object of the present invention is to provide means for equally distributing the spring ejecting force upon the squib body and for guiding the squib evenly out of the valve housing.

Other and further objects of the invention will be obvious upon an understanding of the illustrative embodiments about to be described, or will be indicated in the appended claims, and various advantages not referred to herein will occur to one skilled in the art upon employment of the invention in practice.

A preferred embodiment of the invention and a modification thereof have been chosen for purposes of illustration and description. The preferred embodiment and the modification are not intended to be exhaustive nor to limit the invention to the precise forms disclosed. They are chosen and described in order to best explain the principles of the invention and their application in practical use to thereby enable others skilled in the art to best utilize the invention in various embodiments and modifications as are best adapted to the particular use contemplated.

Figure 1:
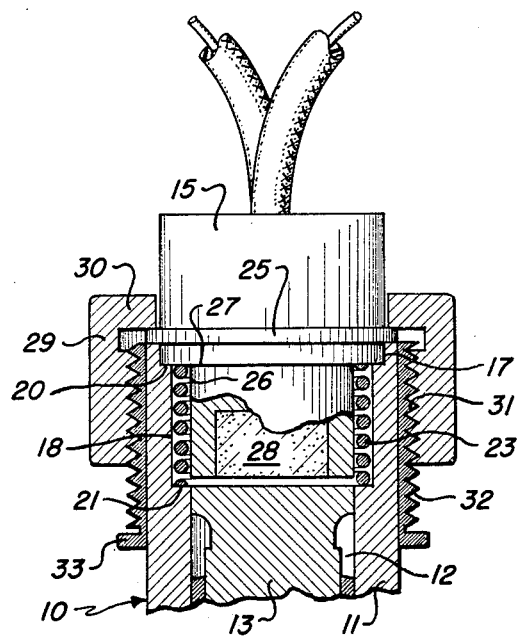
FIG. 1 is a longitudinal sectional view showing a fragmentary portion of an explosive actuated valve with which the principles of a preferred form of the present invention may be associated.
Figure 2:
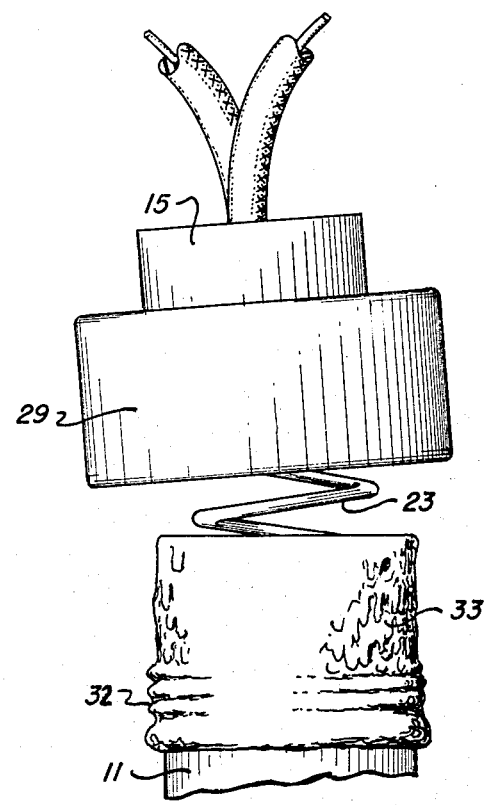
FIG. 2 is a view of a valve similar to the one viewed in FIG. 1 illustrating the present invention in an actuated condition.
Figure 3:
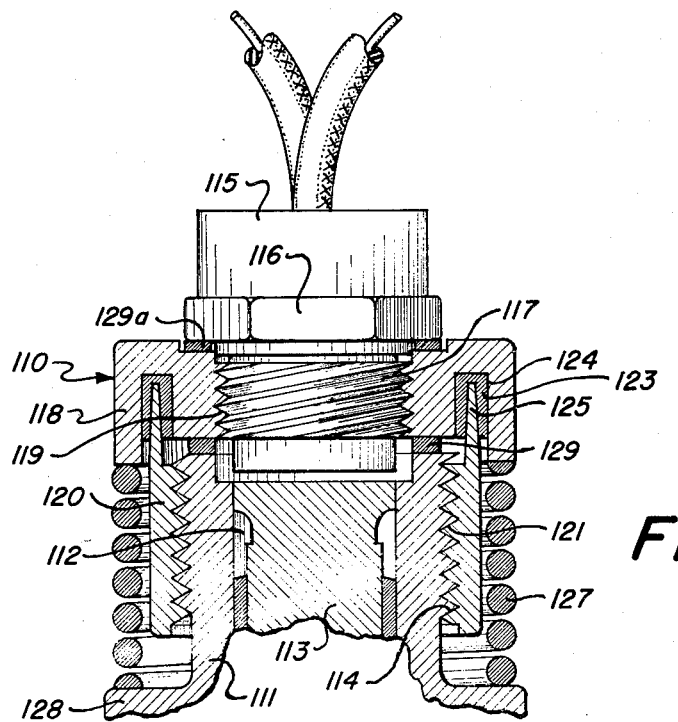
FIG. 3 is a fragmentary longitudinal sectional view showing a modified version of the embodiment illustrated in FIG. 1.

Described generally, the present invention as shown in FIGS. 1–3 is adaptable to an explosive actuated valve which normally includes a valve housing containing a plunger assembly adapted to perforate a closure on a pressurized fluid container upon movement effected by an explosive device, charge or squib. A preferred embodiment of the present device (FIG. 1) comprises a sleeve 29 threadably secured to the housing by temperature responsive threads for holding the exposive device 15 in an effective or operative relationship with the plunger against a repelling force continuously exerted upon the explosive device by a compression spring 23. In the event the valve is expected to excessive temperatures, which may cause premature spontaneous detonation of the explosive device, the temperature responsive threads 32 melt or soften at a temperature somewhat less than that necessary to detonate the explosive device or charge so as to permit the compression spring to repel the charge away from the plunger a sufficient distance so as to render the charge ineffective to move the valve plunger.

The form of the invention illustrated in FIG. 3 differs from that of FIGS. 1 and 2 in the arrangement of the fusible material in that in this embodiment a tongue and groove configuration is utilized, with an outer or exposed end of the tongue 125 secured to the housing 111 and the other end secured in the groove 124 of the sleeve by solder or fusible material 123. Thus, when subjected to excessive temperatures the fusible material melts and releases its bond on the tongue and permits the spring 127 to repel the squib.

Described more specifically, a preferred embodiment of the present invention as shown in FIG. 1 may be used in connection with an explosive actuated valve of the type indicated generally at 10 which, among other things, may be provided with a housing 11 having a centrally disposed bore 12 with a movable plunger 13 positioned therein, and an electrically fired explosive device or squib 15 or furnishing a pressure or shock wave force against the end of the plunger 13 for moving the latter and effecting the opening of a pressurized fluid container (not shown) by perforating a frangible container closure (not shown).

Adjacent the upper end of the bore 12 a pair of longitudinally counter-bored or stepped sections 17 and 18 of different diameters and delimited by shoulders 20 and 21 respectively, are provided for receiving the squib 15 and a helically wound compression spring 23. While the spring 23 in the preferred embodiment is illustrated as being of the helically wound type it will be clear that any suitable type of compression spring may be used.

The squib 15, which normally comprises an electrically detonated explosive charge 28 enclosed in a metal casing adjacent the inner or lower end thereof, may be provided with a circumferentially extending flange 25 intermediate the ends thereof, a recessed portion 26 extending from a point adjacent the flange 25 to the lower end of the squib 15, and an annular shoulder 27 at the upper or inner end of the recessed portion 26. The squib 15 as above formed, is adapted to fit within the stepped sections 17 and 18 of bore 12 with the flange 25 abutting the uppermost end of the housing 11 and with the squib shoulder 27 abutting the bore shoulder 20 so as to position the explosive charge 28 or the temperature sensitive end of the squib adjacent to the plunger 13.

The compression spring 23 may be placed about the recessed portion 26 of the squib 15 immediately prior to the insertion of the squib 15 into the stepped portions of the housing, with one end abutting the shoulder 27 or, alternatively, placed within the stepped section 18 with one end abutting the shoulder 21, so that the subsequent insertion of the squib 15 into the housing 11 compresses the spring 23. It may be desired to provide means for preventing the squib 15 from being ejected to a point remote from the valve where subsequent detonation of the squib 15 might cause damage to other systems or components. This disadvantage may be relieved by securing one end of the spring 23 to the housing in any suitable manner, for example, by a bonding material or the like and similarly securing the other end of the spring to the squib body, thus insuring that the squib 15 remains adjacent to the valve and yet is ejectable away from the main valve body a sufficient distance so as to not move the valve plunger 13. Normally, the valve plunger will not be actuated if at least one-half inch separation is provided between the valve housing 11 and the squib 15.

To hold the squib 15 in the housing 11 against the repelling force exerted by the spring 23, a squib retaining sleeve 29, which may be made of any suitable heat conducting material, such as aluminum or the like, may be provided. The sleeve 29 may have inwardly extending lip 30 adjacent the upper end thereof and a threaded inner surface 31 and be sufficiently large in diameter so as to encircle the housing 11 and permit the lip 30 to abut the upper surface of the squib flange 25. The outer surface of housing 11 is provided with threads 32 which are adapted to mate with relatively non-fusible threads 31 on the inner surface of the sleeve 29. These threads 32 form an important feature of the present invention in that they are made of a material of relatively low temperature melting point which is capable of fusing or melting so as to effectively destroy the threaded joint between the housing 11 and the sleeve 29 when exposed to a predetermined temperature increase, thus permitting the spring 23 to eject the squib 15 from within the housing 11 (as illustrated in FIG. 2).

Various fusing materials or solders may be employed for the fusible material 33. If the squib explosive is such that it detonates or fires at about 450° F. then the alloy or fusible material may be one capable of melting or fusing at about 300° F., thus providing a desirable temperature gap between the melting point of the fusible material and the spontaneous detonation point of the squib explosive. The alloy or other material thread and its length should be such as to provide desired holding power. It has been found that relatively coarse threads 31 and 32 are advantageous and that if the sleeve threads 31 engage about one-half inch of the overall length of the threads 32 on the fusible material 33 then a squib of a commonly used type will usually be held in place during normal squib actuation.

The alloy or fusible material 33 may be of any desired material or composition capable of being bonded, soldered or otherwise attached to the housing 11 or to the sleeve 29, and which has a substantially constant low melting temperature point. An example of a fusible material which may be used successfully with a squib having a spontaneous detonation point of a little under 500° F. is a metal having a eutectic mixture of about 62 percent tin and 38 percent lead. This fusible metal provides the desirable qualities of having a nearly constant 361° F. melting temperature, ready availability, ductibility, and ease of fabrication. When attaching the fusible material 33 to the housing 11 it may be desirable to roughen the housing surface or coat the housing 11 with a suitable metal such as copper to thereby provide a better bond between the housing and the fusible material. It may also be desirable to cover a greater surface area of the housing with a fusible material than is necessary for the desired thread length so as to prevent the bond between the housing and the fusible material from yielding prior to the fusing of the threads 32. While the fusible threads are illustrated and described as being attached to the housing 11 it will be clear to another skilled in the art to place the fusible threads in the sleeve 29 while providing the outer surface of the housing 11 with the relatively non-fusible threaded surface.

The possibility of the squib 15 being wedged against the housing 11 in the event of uneven spring expansion when the metal 33 melts is minimized by the spring placement wherein the side walls act as a spring guide to insure that the squib is ejected directly away from the valve housing.

In the form of the invention shown in FIG. 3 a valve housing 111 is provided with a bore 112 having therein a movable plunger 113 for perforating a frangible container closure (not shown) or for opening or closing a port. The housing 111 may be somewhat shorter than housing 11 (FIG. 1) so as have the upper end thereof terminate adjacent the uppermost end of the plunger 113, and be provided with a threaded outer surface 114 for performing a joining function as will be described in detail below.

A squib 115 may be provided with a metal outer casing enclosing an explosive charge adjacent to the lower or inner end thereof and also with a nut-like flange 116 intermediate the ends thereof. Threads 117 are provided on one side of the flange 116 and are adapted to be secured to an annular collar or sleeve 118 which may be provided with a threaded inner surface 119 for engaging the squib threads 117.

The sleeve 118 includes an annular longitudinal extension 120 having a threaded inner surface 121 adapted to engage a threaded outer surface 114 of the housing 111, to thus secure the squib 115 to the housing 111 in an effective operative relationship with the plunger 113. The extension 120 and the collar or sleeve 118 are initially constructed separately and then joined together by a temperature responsive fusible bonding material or solder 123, the sleeve 118 preferably being provided with an annular groove 124 for receiving both the fusible material 123 and an end section or tongue portion 125 of the extension 120, which may be slightly tapered for facilitating assembly and operation of the tongue and groove assembly. The fusible material 123, which may be placed in the groove 124 either prior to or subsequent to the insertion of the tongue portion 125, may be treated or handled in any suitable manner to establish a secure bond between the tongue portion 125 and the sleeve 118.

While, as with the embodiment illustrated in FIG. 1, the fusible material 123 may comprise any suitable substance or composition capable of establishing a temperature responsive bond between the tongue 125 and the sleeve 118, good results have been obtained by using a fusible metal comprising an eutectic mixture of 47 percent lead, 50 percent tin and 3 percent antimony. Joining the tongue portion 125 to the sleeve 118 when using a fusible material such as the lead, tin and antimony mixture may be satisfactorily attained by placing the sleeve 118 (less the squib) on a heating surface, such as a hot plate, with the groove 124 opening upwardly, dropping into the groove 124 a ring of the fusible material 123 and thereafter placing the tongue into the groove 124. It may be necessary to feed more fusible material 123 into the groove 124 to fill it after the tongue portion 125 is in a desired position. The tongue portion 125 may be preliminarily coated with a thin layer of copper and ultrasonic vibration may each be used to enhance the bond between the tongue 125 and the sleeve 118.

To provide means for ejecting the squib 115 away from the housing 111 when the valve is in an excessive temperature environment, a compression spring 127 may be placed about the extension 120 with one end of the spring abutting the bottom of the sleeve 118 and the other end abutting a flange 128 on the housing 111. This spring 127, like that shown in the embodiment of FIGS. 1 and 2, is preferably a helically wound compression spring but may be of any other suitable type. It may be desired to provide the spring 127 with a flat surface where it contacts the sleeve 118 and the flange 128 so as to provide an optimum spring seating surface. As with the spring arrangement in FIG. 1, uneven ejection of the squib 115 from the housing 111 which might tend to make the sleeve 118 wedge against the extension 120, is minimized by using the sleeve extension 120 as a spring guide.

To assemble the device illustrated in FIG. 3 the squib 115 may be initially or at any desired time screwed into the sleeve 118 (which has been previously provided with the extension 120), the spring 127 is then placed upon the flange 128, or around the extension 120, and thereafter the sleeve extension is screwed onto the housing to complete the assemblage. It may be desirable during the assembly to position a first gasket or washer 129 of suitable material such as soft copper between the sleeve 118 and the upper end of the housing 111 and another similar gasket or washer 129a between the sleeve 118 and the squib 115, thus providing better seals and connections between the parts. While threaded surfaces are disclosed as being the preferred method of attaching the squib 115 to the sleeve 118 and the extension 120 to the housing 111, it will appear obvious that other attaching means such as welding or the like may be used.

It will be seen that the present invention provides a highly desirable safety type explosive actuated valve, which may be provided at low cost and which is highly efficient for preventing premature valve actuation and also for preventing undesirable valve actuation where the fluid may be passed into an improperly functioning system.

As various changes may be made in the form, construction and arrangement of the parts herein without departing from the spirit and scope of the invention and without sacrificing any of its advantages, it it to be understood that all matter herein is to be interpreted as illustrative and not in a limiting sense.

I claim:

1. A device of the character described comprising the combination of a generally tubular housing having an end portion forming a chamber to receive the sensitive portion of an explosive squib, a plunger within said housing having an end portion exposed to said chamber, squib retaining means for engaging said housing and a said squib to releasably maintain the squib in close proximity to said plunger end portion including a retaining ring of fusible material spaced outwardly from and encircling at least part of a said squib and part of its sensitive portion for reception of heat from an external source prior to appreciable reception thereof by the sensitive portion of the squib, an annular compression spring bearing at one end against said housing for urging at least a portion of the squib retaining means and a said squib away from said housing and from said plunger end portion upon subjection of the fusible material to heat sufficient to melt at least a portion thereof, and guide means for said spring to maintain even expansion thereof as a said squib is being urged away from said housing.

2. The device claimed in claim 1 wherein said squib retaining means comprises a sleeve with a threaded inner surface and normally encircles a portion of said housing, and wherein said fusible material comprises a fusible metal having a low temperature melting point secured to an outer surface of said housing inwardly of said sleeve and includes a threaded outer surface normally mating with the threaded inner surface on said sleeve.

3. The device claimed in claim 1 wherein said squib retaining means comprises a pair of separable portions, one portion having a groove therein and secured to a said squib and the other portion secured to an outer surface of said housing with an end portion thereof extending into said groove, said fusible material is disposed in said groove for normally retaining said separable portions together, and wherein another end of said annular spring bears against the separable portion secured to a said squib.

4. The device claimed in claim 3 wherein the end portion of said other portion is of tapering cross-section, and wherein said fusible material comprises fusible metal.

* * * * *